(12) United States Patent
Goenka et al.

(10) Patent No.: US 7,743,614 B2
(45) Date of Patent: Jun. 29, 2010

(54) THERMOELECTRIC-BASED HEATING AND COOLING SYSTEM

(75) Inventors: Lakhi N. Goenka, Ann Arbor, MI (US); Douglas T. Crane, Pasadena, CA (US); Lon E. Bell, Altadena, CA (US)

(73) Assignee: BSST LLC, Irwindale, CA (US)

( * ) Notice: Subject to any disclaimer, the term of this patent is extended or adjusted under 35 U.S.C. 154(b) by 1357 days.

(21) Appl. No.: 11/101,871

(22) Filed: Apr. 8, 2005

(65) Prior Publication Data

US 2006/0225441 A1    Oct. 12, 2006

(51) Int. Cl.
*F25B 21/02*    (2006.01)

(52) U.S. Cl. .............................. 62/3.3; 62/3.7; 62/259.2

(58) Field of Classification Search .................... 62/3.2, 62/3.3, 3.7, 259.2; 165/104.33, 42
See application file for complete search history.

(56) References Cited

U.S. PATENT DOCUMENTS

| | | | |
|---|---|---|---|
| 4,402,188 A * | 9/1983 | Skala | 62/56 |
| 4,444,851 A | 4/1984 | Maru | |
| 4,848,090 A * | 7/1989 | Peters | 62/3.3 |
| 5,119,640 A | 6/1992 | Conrad | |
| 5,232,516 A | 8/1993 | Hed | |
| 5,556,028 A * | 9/1996 | Khelifa | 237/12.3 A |
| 5,653,111 A | 8/1997 | Attey et al. | |
| 5,722,249 A | 3/1998 | Miller, Jr. | |
| 5,901,572 A | 5/1999 | Peiffer et al. | |
| 5,964,092 A * | 10/1999 | Tozuka et al. | 62/3.7 |
| 5,977,785 A * | 11/1999 | Burward-Hoy | 324/760 |
| 6,276,166 B1 * | 8/2001 | Sarkisian et al. | 62/480 |
| 6,457,324 B2 * | 10/2002 | Zeigler et al. | 62/406 |
| 6,598,405 B2 * | 7/2003 | Bell | 62/3.3 |
| 6,672,076 B2 * | 1/2004 | Bell | 62/3.3 |
| 6,705,089 B2 * | 3/2004 | Chu et al. | 62/3.2 |
| 6,862,892 B1 | 3/2005 | Meyer et al. | |
| 2004/0045594 A1 | 3/2004 | Hightower | |
| 2004/0237541 A1 | 12/2004 | Murphy | |

FOREIGN PATENT DOCUMENTS

| | | |
|---|---|---|
| JP | 10-35268 | 2/1998 |
| JP | 10035268 | 2/1998 |
| JP | 2000-161721 | 6/2000 |
| JP | 2001-267566 | 9/2001 |
| JP | 2001-304778 | 10/2001 |
| JP | 2001304778 | 10/2001 |
| JP | 2002-359370 | 12/2002 |
| JP | 2006001530 | 1/2006 |

OTHER PUBLICATIONS

Office Action dated Aug. 6, 2008, Application No. 2006-305938.

* cited by examiner

*Primary Examiner*—Melvin Jones
(74) *Attorney, Agent, or Firm*—Knobbe, Martens, Olson & Bear, LLP

(57) ABSTRACT

Disclosed is a heating, ventilation and air conditioning system for a vehicle that operates in a heating mode, a cooling mode or a demisting mode. The system includes a first circuit having first pump for circulating a first medium therein, a second circuit having a second pump for circulating a second medium therein and a thermoelectric module having a first surface in thermal contact with the first medium and a second surface in thermal contact with the second medium.

30 Claims, 4 Drawing Sheets

THERMOELECTRIC-BASED HEATING AND COOLING SYSTEM

BACKGROUND

1. Field of the Invention

The present invention generally relates to heating, ventilation and air conditioning ("HVAC") systems for a vehicle, and more particularly to HVAC systems having thermoelectric modules for providing heating and cooling to a passenger compartment of the vehicle.

2. Description of the Known Technology

In a conventional vehicle, such as an automobile, the heating of the passenger compartment is accomplished by running engine coolant, typically a mix of water and glycol, through a heat exchanger and then blowing air through the heat exchanger and into the passenger compartment. The drawback with this is that the heat exchanger will not provide heat until the engine has caused the coolant to warm up. In colder climates, the time to warm up the coolant can be lengthy, thereby delaying warming of passengers of the automobile.

Furthermore, newer engines and powertrain arrangements are being developed where the engine does not produce as much excess heat for the coolant to absorb. Some examples include direct injection engines and hybrid powertrains. For these types of engines and powertrains, the temperature of the coolant can take a very long time to rise to a level that will allow for adequate heating of the passenger compartment when using a conventional heating system.

Therefore, it is desired to provide a HVAC system that provides heat to the passenger compartment of the vehicle more quickly than a conventional system.

BRIEF SUMMARY

In overcoming the drawbacks and limitations of the known technologies, a system of heating and cooling the passenger compartment of an automobile is disclosed. The heating and cooling system includes a first circuit and a second circuit. The first circuit includes a first pump for circulating a first medium therethrough, a first heat exchanger and a third heat exchanger. The second circuit includes a second pump for circulating a second medium therethrough, a second heat exchanger and a fourth heat exchanger. Additionally, the system includes a thermoelectric module having a first surface in thermal contact with the first heat exchanger and a second surface in thermal contact with the second heat exchanger.

The system operates in a heating mode, a cooling mode and a demisting mode. In the heating mode, an electrical current is passed through the thermoelectric module so that the second side of the thermoelectric module warms the second medium through the second heat exchanger. An engine, which is operatively engaged with the first circuit, warms the first medium. As the first and second mediums are warmed, the first and second pumps circulate the mediums through the third and fourth heat exchangers respectively.

The third and fourth heat exchangers are located near a blower. Generally, the third heat exchanger is located between the blower and the fourth heat exchanger such that blower will move air through the third heat exchanger before moving air through the fourth heat exchanger. After the air passes through the third and fourth heat exchangers, the air enters the passenger compartment of the automobile.

In the cooling mode, an electrical current is passed through the thermoelectric module so that the second side of the thermoelectric module cools the second medium through the second heat exchanger. The second pump circulates the cooler second medium through the fourth heat exchanger. In this mode, the first medium is directed through the second bypass line by the second double switching valve. By utilizing the second bypass line, the heated first medium is either reduced or not directed through the third heat exchanger. The air passing through the third heat exchanger will not be heated or will be heated by a reduced amount, while the air passing through the fourth heat exchanger will be cooled.

In the demisting mode, the air provided by the blower is first cooled before it is heated and/or passed to the passenger compartment. By initially cooling the air, moisture can be removed from the air via condensation. One way to accomplish this is through the addition of another heat exchanger placed between the blower and the third heat exchanger. Through the use of bypass lines and double switching valves, the cooled second medium will be directed to the heat exchanger placed between the blower and the third heat exchanger. The air provided by the blower will first be cooled by the heat exchanger placed between the blower and the third heat exchanger before the air is heated by the third heat exchanger. Alternatively, the third heat exchanger 32 may be split into multiple portions, such that some portions may heat and other portions may cool.

Another way of accomplishing demisting is through the addition of multiple bypass lines and double switching valves. The bypass lines and double switching valves will direct the first medium to the fourth heat exchanger and will direct the second medium to the third heat exchanger. By directing the cooler second medium to the third heat exchanger and the warmer first medium to the fourth heat exchanger, the air provided by the blower will first be cooled by the third heat exchanger before it is warmed by the fourth heat exchanger. Other alternative fluid paths and other heat exchanger configurations may also be utilized.

These and other advantages, features and embodiments of the invention will become apparent from the drawings, detailed description and claims which follow.

DETAILED DESCRIPTION

Figure 1:
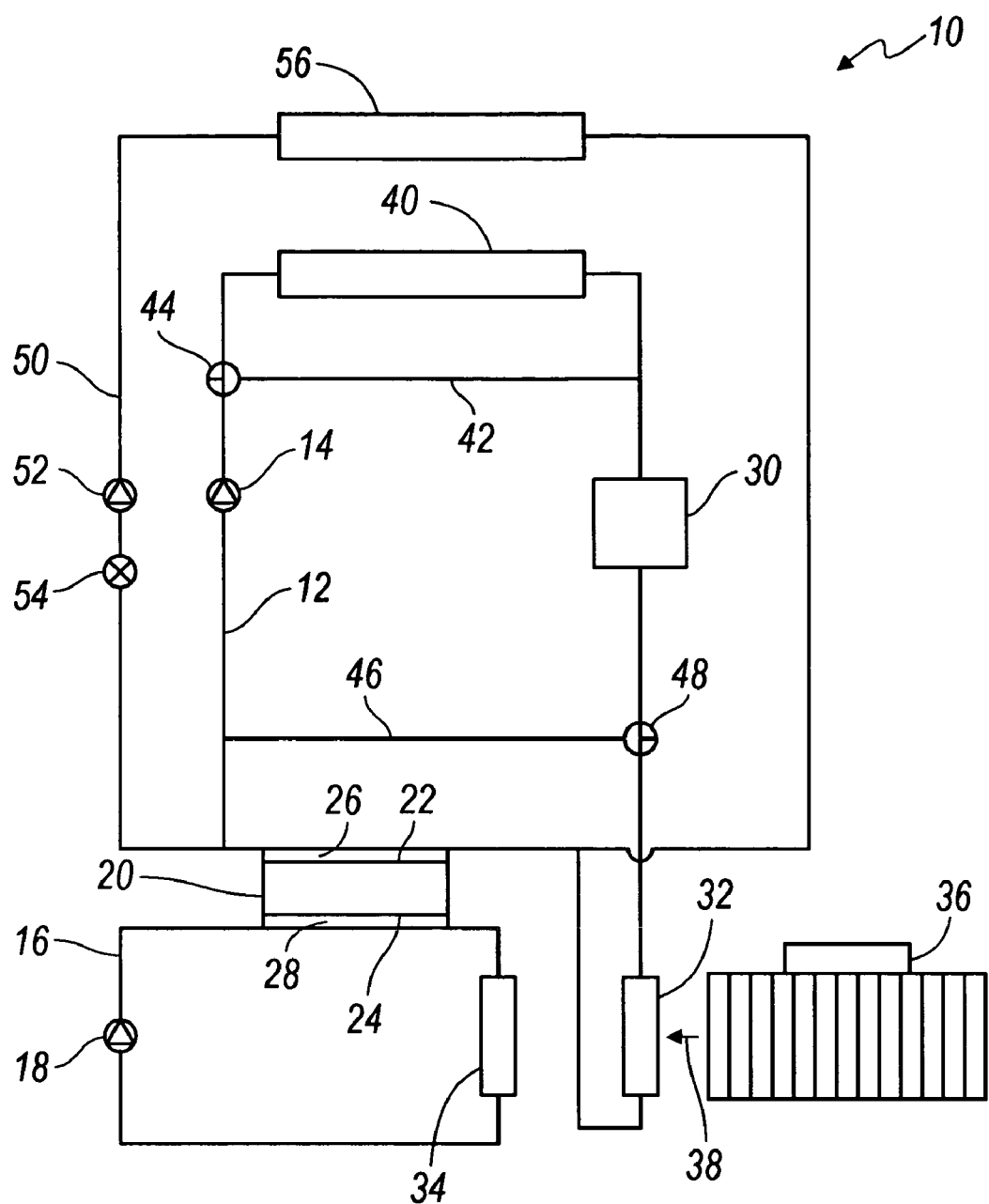
FIG. 1 is a block diagram of an HVAC unit embodying the principles of the present invention.

Referring to FIG. 1, the various components of a HVAC unit 10 are shown. The HVAC unit 10 includes a first circuit 12 having a first pump 14, a second circuit 16 having a second pump 18, and a thermoelectric module 20 having a first surface 22 and a second surface 24 in thermal communication with the first and second circuits 12, 16, respectively. The first pump 14 circulates a first medium through the first circuit, and the second pump 18 circulates a second medium through the second circuit 16.

In the context of this description, the term "pump" is used in its broad sense of its ordinary and customary meaning and further includes any conventional pump, J×B (J Cross B) pump, electrostatic pump, centrifugal pump, positive displacement pump, gear pump, peristaltic pump or any other medium moving device or combination thereof that is known or later developed.

Generally, the first and second mediums are a liquid having a mix of water and glycol. Alternatively, the first and/or second mediums may be a fluid, gas or multipurpose solid-liquid convection medium.

In the context of this description, the term "thermoelectric module" is used in a broad sense of its ordinary and customary meeting, which is (1) conventional thermoelectric modules, such as those produced by Marlow Industries, Inc. of Dallas, Tex., (2) quantum tunneling converters, (3) thermionic modules, (4) magneto caloric modules, (5) elements utilizing one, or any bi-combination of, thermoelectric, magneto caloric, quantum tunneling and thermionic effects, (6) acoustic heating mechanisms, (7) thermoelectric systems described is U.S. Pat. No. 6,539,725 to Bell, (8) any other sold state heat pumping device (9) any combination, array, assembly and other structure of (1) through (8) above.

In thermal communication with a first heat exchanger 26 is the first surface 22 of the thermoelectric module 20. The first heat exchanger 26 is in turn in thermal communication with the first medium of the first circuit 12. In thermal communication with a second heat exchanger 28 is the second surface 24 of the thermoelectric module 20. This second heat exchanger 28 is likewise in thermal communication with the second medium of the second circuit 16.

Preferably, an internal combustion engine 30 is operatively engaged with the first circuit 12 such that the first medium is circulated by the first pump 14 and is used to cool the engine 30. Alternatively, the engine 30 can be any heat generating source that is known or later developed.

Connected to the first circuit 12 is a third heat exchanger 32 and connected to the second circuit 16 is a fourth heat exchanger 34, both of which are used to condition (heat or cool) air to be provided to the passenger compartment. Accordingly, proximate to the third and fourth heat exchangers 32, 34 is a blower 36. As indicated by the arrow 38, the blower 36 moves air through the third heat exchanger 32 and the fourth heat exchanger 34 before moving the air into the passenger compartment of an automobile. The blower 36 may be a conventional blower, fan, electrostatic blower, centrifugal blower or any air moving system that is known or later developed.

Preferably, the first circuit 12 has a fifth heat exchanger 40, generally a radiator, for cooling the first medium within the first circuit 12. Alternatively, the fifth heat exchanger 40 may be a heat sink or any device that absorbs or rejects heat including the traditional radiator, frame or other vehicle parts. A first bypass line 42 and a first double switching valve 44 are connected to the first circuit 12 such that the first double switching valve 44 can selectively direct the first medium through the first bypass line 42 instead of the fifth heat exchanger 40. By circulating the first medium through the first bypass line 42 instead of the fifth heat exchanger 40, the first medium can be heated more quickly by the engine 30 because the fifth heat exchanger 40 will not have an opportunity to cool the first medium. This is beneficial when the first medium is very cold.

In the context of this description, the term "double switching valve" is used in its broad sense of its ordinary and customary meaning and further includes any valve or medium directing device or combination thereof that is known or later developed.

The first circuit 12 may also have a second bypass line 46 and a second double switching valve 48. The second double switching valve 48 can selectively direct the first medium through the second bypass line 46 (during cooling mode operation) instead of through a section of the first circuit 12 that includes the third heat exchanger 32. By circulating the first medium through the second bypass line 46, the first medium will be unable to transfer heat to the third heat exchanger 32, and thus air provided by the blower 36 will not be heated by the third heat exchanger 32. Additionally, the temperature of the first surface 22 of the thermoelectric module 20 will not be affected by the first medium. This can be advantageous when the HVAC unit 10 is cooling the passenger compartment of the automobile.

The HVAC unit 10 operates in either a heating mode or a cooling mode. In the heating mode, the direction of the current flowing through the thermoelectric module 20 will be such that the first surface 22 cools and the second surface 24 warms. The second surface 24 will pass the heat through the second heat exchanger 28 and to the second medium. As the second medium is passed through the fourth heat exchanger 34, the air provided by the blower 36 is heated thereby. This augments any heating of the air by the third heat exchanger 32.

As the engine 30 warms up, it heats the first medium that will be circulated through the third heat exchange 32 and the first heat exchanger 26. The heat of the first medium is passed through the first heat exchanger 26 to first surface 22 of the thermoelectric module 20. By warming the first surface 22 of the thermoelectric module 20, the difference in temperature between the first surface 22 and the second surface 24 will be minimized, allowing the thermoelectric module 20 to operate more efficiently.

In a cooling mode, the direction of the current flowing through the thermoelectric module 20 will be such that the second surface 24 of the thermoelectric module 20 cools and the first surface 22 of the thermoelectric module 20 warms. The second surface 24 will cool the second medium via the second heat exchanger 28 and, as the cooled second medium is passed through the fourth heat exchanger 34, the air, provided by the blower 36, is cooled before entering the passenger compartment.

In this mode, the first medium is directed through the second bypass line 46 by the second double switching valve 48. By utilizing the second bypass line 46, the heated first medium is not directed through the third heat exchanger 32 and subsequently the first heat exchanger 26 and the first surface 22 of the thermoelectric module 20. The temperature of the first surface 22 of the thermoelectric module 20 therefore not heated, remaining closer in temperature to the second surface 24. As stated before, by having a low temperature differential between the first surface 22 and a second surface 24 of the thermoelectric module 20, the thermoelectric module will operate more efficiently. Additionally, because the third heat exchanger 32 will not be heated by the first medium, air passing through the third heat exchanger 32 will not be heated.

Generally, the first circuit 12 will have a branch circuit 50 having its own pump 52, valve 54 and heat exchanger 56. The branch or third circuit 50 is used to supplement the cooling of a portion of the first medium and the first surface 22. For example, when the valve 54 is configured to allow a portion of the first medium to flow through the branch circuit 50, the heat exchanger 56 of the branch circuit will aid in the cooling of the first medium. It is noted that during this such operation, valve 48 will also be directing a portion of the first medium across bypass line 46. When the valve 54 is configured to prevent the first medium from circulating through the branch circuit 50, the heat exchanger 56 will not supplement the cooling of the first medium.

Figure 2:
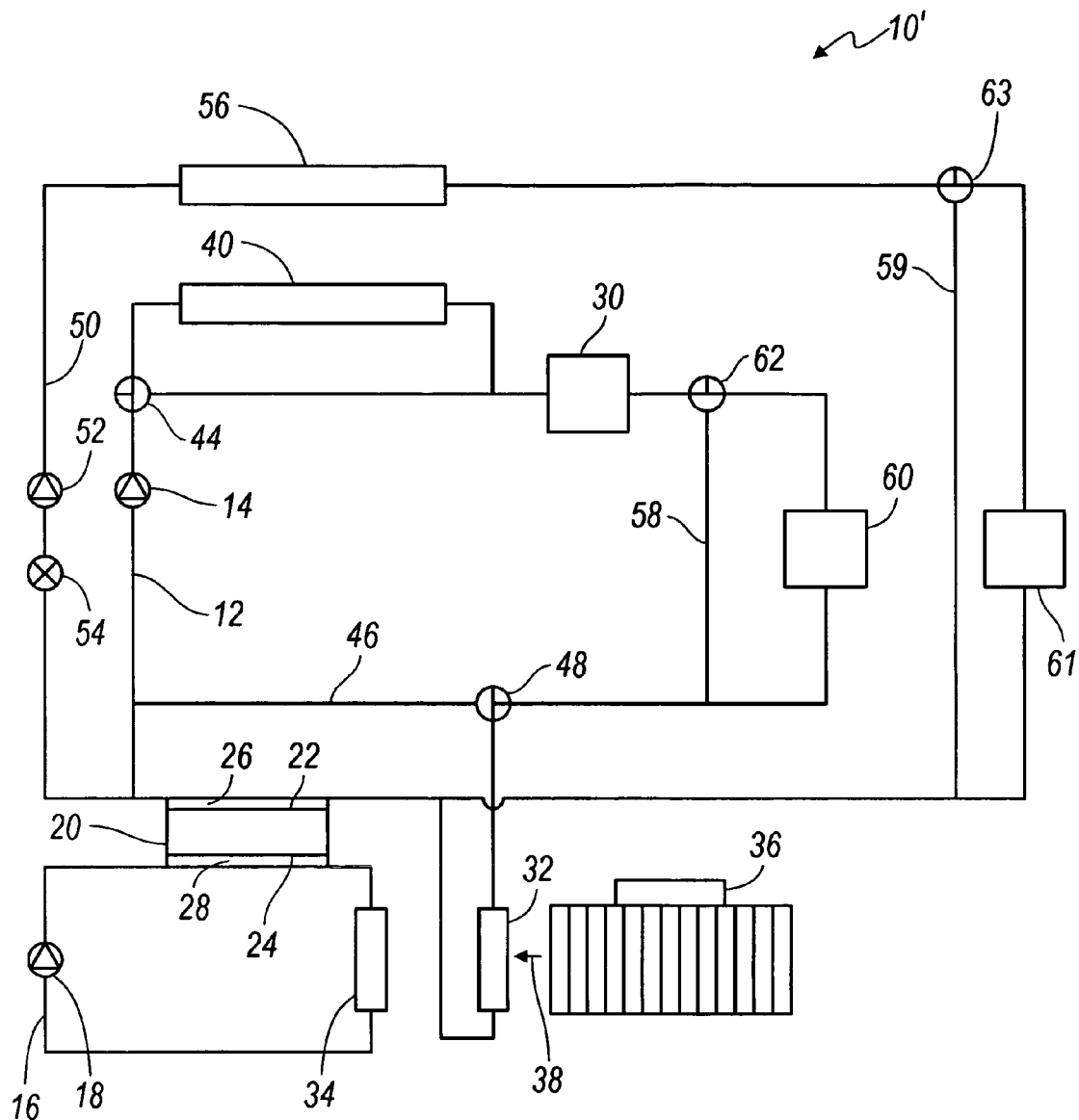
FIG. 2 is a block diagram of a second embodiment of an HVAC unit according to the principles of the present invention and including a supplemental heating source and cooling source.

Referring now to FIG. 2, another HVAC unit 10' is shown. This unit 10' is the same as that discussed previously, except, the first circuit 12 includes a heat generating system 60 located between the engine 30 and valve 48 and the third circuit 50 includes a cold generating system 61 located between the heat exchanger 56 and the first heat exchanger 26. A bypass line 58 and associated double switching valve 62 are also provided so that the first medium may be bypassed around the heat generating system 60, if desired. The heat generating system 60 may be one or more of any system that generates, captures or releases heat, such as a battery, an electronic device, an internal combustion engine, an exhaust of a vehicle, a heat sink, a heat storage system such as a phase change material, a positive temperature coefficient device or any heat generating system that is known or later developed. The third double switching valve 62 will direct the first medium through either the third bypass line 58 or the heat generating system 60. By circulating the first medium through the heat generating system 60, the first medium can be heated more quickly than by the engine 30 alone.

A bypass line 59 and associated double switching valve 63 are also provided so that the first medium may be bypassed around the cold generating system 61, if desired. The cold generating system 61 may be one or more of any system that generates, captures or releases cold, such as a thermoelectric module, a heat sink, a cold storage system such as a phase change material or any cold generating system that is later developed. The double switching valve 63 will direct the first medium through either the bypass line 59 or the cold generating system 61. By circulating the first medium through the cold generating system 61, the first medium can be cooled more quickly than by the heat exchanger 56 alone.

Figure 3:
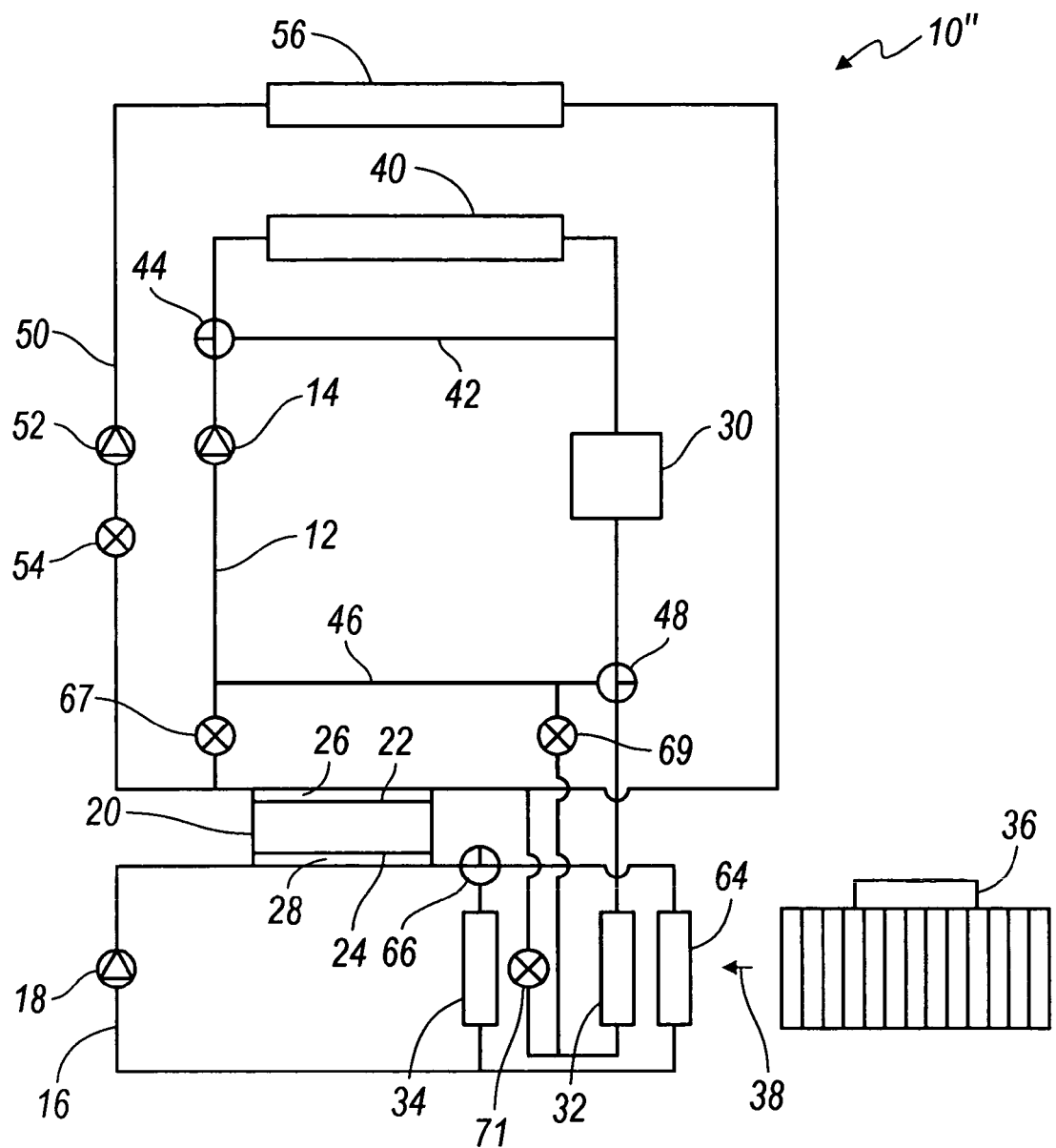
FIG. 3 is a block diagram of a third embodiment of an HVAC unit with according to the principles of the present invention and including a demisting heat exchanger.

Referring now to FIG. 3, another embodiment of a HVAC unit 10" is shown. This unit 10" is substantially the same as that discussed above and shown in FIG. 1. However, a demisting heat exchanger 64 is provided in the second circuit 16 as a bypass, via double switching valve 66, around the fourth heat exchanger. Thus, the demisting double switching valve 66 will selectively direct the second medium through the demisting heat exchanger 64 instead of the fourth heat exchanger 34. As indicated by the arrow 38, the blower 36 will blow air first through the demisting heat exchanger 64. This initial cooling of the air removes moisture from the air via condensation.

After the air is initially cooled, the air may be cooled or heated by the third heat exchanger 32. The valves 67, 69 and 71 will direct the first medium through either first circuit 12, where it is warmed by the engine 30, or through the third circuit 50, where it is cooled by the heat exchanger 56, and then through the third heat exchanger 32. Alternatively, the double switching valve 48 may prevent the first medium from traveling through the third heat exchanger 32, thereby preventing any heating or cooling the air by the third heat exchanger 32.

Figure 4:
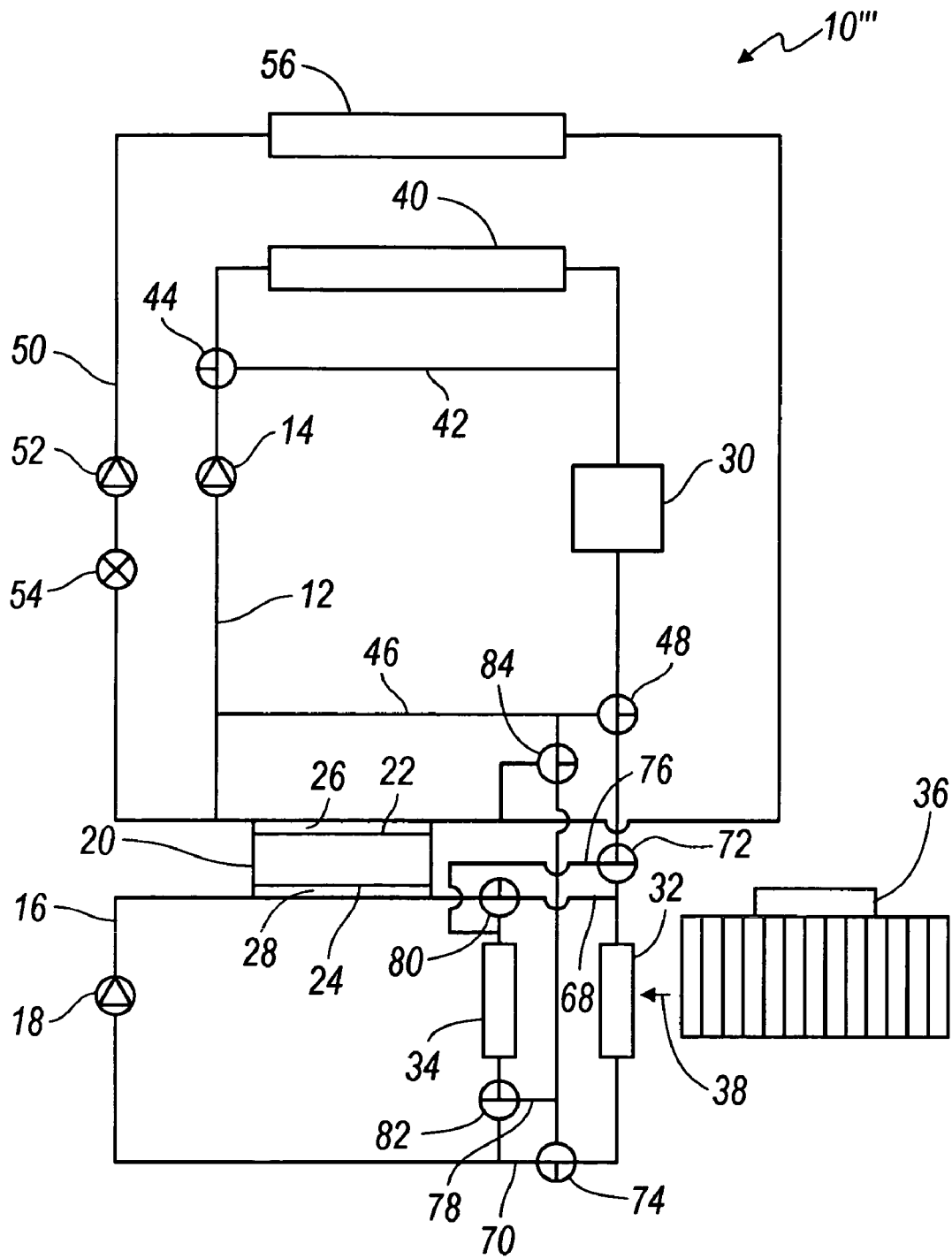
FIG. 4 is a block diagram of a fourth embodiment of the HVAC unit with bypass lines for transferring first and second mediums between a third heat exchanger and a fourth heat exchanger.

Referring now to FIG. 4, another embodiment of the HVAC unit 10''' is shown. The HVAC unit 10''' is substantially the same as the discussed above and shown in FIG. 1. However, a fourth bypass line 68 and a fifth bypass line 70 circulate the second medium to the third heat exchanger 32 and a sixth bypass line 76 and a seventh bypass line 78 circulate the first medium to the fourth heat exchanger 34.

A fourth double switching valve 72 will direct the second medium from the second circuit 16, through the fourth bypass line 68, and to the third heat exchanger 32. A fifth double switching valve 74 will direct the second medium from the third heat exchanger 32, through the fifth bypass line 70, and to the second circuit 16.

A sixth double switching valve 80 will direct the first medium from the first circuit 12, through the sixth bypass line 76, and to the fourth heat exchanger 34. A seventh double switching valve 82 will direct the first medium from the fourth heat exchanger 34, through the seventh bypass line 78, and to the first circuit 12.

By directing the cooler second medium and warmer first medium through the third heat exchanger 32 and the fourth heat exchanger 34 respectively, the third heat exchanger 32 will cool air blown by the blower 36 before the air is heated by the fourth heat exchanger 34. The initial cooling of the air removes moisture from the air via condensation.

Additionally, an eighth double switching valve 84 may be connected to the second bypass line 46 and the first circuit 12. The eighth double switching valve 84 will direct the first medium through either the second bypass line 46 or the first heat exchanger 26. By circulating the first medium through the second bypass line 46, the first heat exchanger 26 will not be in thermal communication with the warmer first medium. This can be advantageous when the HVAC unit 10 is in the cooling mode. The heat contained within the first medium will be unable to transfer heat to the first surface 22 of the thermoelectric module 20. By minimizing the temperature differential between the first surface 22 and the second surface 24 of the thermoelectric module 20, the thermoelectric module 20 will operate more efficiently.

As a person skilled in the art will readily appreciate, the above description is meant as an illustration of implementation of the principles of this invention. This description is not intended to limit the scope or application of this invention in that the invention is susceptible to modification, variation and change, without departing from spirit of this invention, as defined in the following claims.

We claim:

1. A heating and cooling system for a vehicle, the heating and cooling system comprising:
   a first circuit having a first pump for circulating a first medium therethrough;
   a second circuit having a second pump for circulating a second medium therethrough;
   a first heat exchanger in thermal communication with the first medium;
   a second heat exchanger in thermal communication with the second medium; and
   a thermoelectric module having a first surface in thermal communication with the first heat exchanger and a second surface in thermal communication with the second heat exchanger, whereby the second surface is performing one of heating and cooling the second medium;
   wherein the system is configured to heat a passenger compartment of the vehicle when a heating mode is selected;
   wherein current flows in a first direction through the thermoelectric module such that the first surface cools the first heat exchanger and the second surface heats the second heat exchanger when the heating mode is selected;
   wherein the system is further configured to cool the passenger compartment of the vehicle when a cooling mode is selected; and
   wherein current flows in a second direction through the thermoelectric module such that the first surface warms the first heat exchanger and the second surface cools the second heat exchanger when the cooling mode is selected.

2. A heating and cooling system for a vehicle, the heating and cooling system comprising:
a first circuit having a first pump for circulating a first medium therethrough;
a second circuit having a second pump for circulating a second medium therethrough;
a first heat exchanger in thermal communication with the first medium;
a second heat exchanger in thermal communication with the second medium;
a thermoelectric module having a first surface in thermal communication with the first heat exchanger and a second surface in thermal communication with the second heat exchanger, whereby the second surface is performing one of heating and cooling the second medium; and
an engine being operatively engaged with the first circuit.

3. The system of claim 2, further comprising a third heat exchanger in thermal communication with the first medium.

4. The system of claim 3, further comprising a blower configured to move air through the third heat exchanger.

5. The system of claim 2, further comprising a third heat exchanger in thermal communication with the second medium.

6. The system of claim 5, further comprising a blower configured to move air through the third heat exchanger.

7. The system of claim 2, further comprising a third heat exchanger being operatively engaged with the first circuit.

8. The system of claim 7, wherein the third heat exchanger is a radiator.

9. The system of claim 7, wherein the first circuit further comprises an at least one bypass line and an at least one valve configured to direct the first medium through one of the at least one bypass line and the first heat exchanger.

10. The system of claim 2, wherein the first circuit further comprises an at least one bypass line, wherein the first medium is circulated through the at least one bypass line, thereby preventing the first medium from being in thermal communication with the first heat exchanger.

11. The system of claim 10, further comprising an at least one double switching valve configured to direct the first medium through one of the at least one bypass line and the first circuit in thermal communication with the first heat exchanger.

12. A heating and cooling system for a vehicle, the heating and cooling system comprising:
a first circuit having a first pump for circulating a first medium therethrough;
a second circuit having a second pump for circulating a second medium therethrough;
a first heat exchanger in thermal communication with the first medium;
a second heat exchanger in thermal communication with the second medium;
a thermoelectric module having a first surface in thermal communication with the first heat exchanger and a second surface in thermal communication with the second heat exchanger, whereby the second surface is performing one of heating and cooling the second medium; and
a third circuit having a third pump, a valve and a sixth heat exchanger, the third circuit being connected to the first circuit.

13. The system of claim 12, further comprising a cold generating system being operatively engaged with the third circuit.

14. The system of claim 13, wherein the third circuit further comprises an at least one bypass line and an at least one valve configured to direct the first medium through one of the at least one bypass line and the cold generating system.

15. The system of claim 13, wherein the cold generating system is a thermoelectric device.

16. The system of claim 13, wherein the cold generating system is a cold storage system.

17. The system of claim 16, wherein the cold storage system is a phase change material.

18. The system of claim 5, wherein the second circuit further comprises a demisting heat exchanger and an at least one valve, whereby the at one least valve directs the second medium through at least one of the third heat exchanger and the demisting heat exchanger.

19. A heating and cooling system for a vehicle, the heating and cooling system comprising:
a first circuit having a first pump configured to circulate a first medium therethrough;
a second circuit having a second pump configured to circulate a second medium therethrough;
a first heat exchanger in thermal communication with the first medium;
a second heat exchanger in thermal communication with the second medium;
a thermoelectric module having a first surface in thermal communication with the first heat exchanger and a second surface in thermal communication with the second heat exchanger, whereby the second surface is configured to perform one of heating and cooling the second medium; and
a heat generating system being operatively engaged with the first circuit
wherein the first circuit further comprises at least one bypass line and at least one valve configured to direct the first medium through one of the at least one bypass line and the heat generating system.

20. The system of claim 19, wherein the heat generating system is a battery.

21. The system of claim 19, wherein the heat generating system is an electronic device.

22. The system of claim 19, wherein the heat generating system is an internal combustion engine.

23. The system of claim 19, wherein the heat generating system is positive temperature coefficient device.

24. The system of claim 19, wherein the heat generating system is an exhaust of the vehicle.

25. The system of claim 19, wherein the heat generating system is a fuel cell.

26. The system of claim 19, wherein the heat generating system is a thermoelectric device.

27. The system of claim 19, wherein the heat generating system is a heat storage system.

28. The system of claim 27, wherein the heat storage system is a phase change material.

29. The system of claim 1, wherein the thermoelectric module transfers thermal energy from the first heat exchanger to the second heat exchanger in the heating mode, and wherein the thermoelectric module transfers thermal energy from the second heat exchanger to the first heat exchanger in the cooling mode.

30. The system of claim 1, further comprising a third heat exchanger operatively engaged with the second circuit and configured to be in thermal communication with an airflow.

* * * * *

UNITED STATES PATENT AND TRADEMARK OFFICE
CERTIFICATE OF CORRECTION

PATENT NO. : 7,743,614 B2 Page 1 of 1
APPLICATION NO. : 11/101871
DATED : June 29, 2010
INVENTOR(S) : Goenka et al.

It is certified that error appears in the above-identified patent and that said Letters Patent is hereby corrected as shown below:

Column 7, line 36, in Claim 9, change "first heat" to --fifth heat--.

Column 8, line 13 (Approx.), in Claim 18, change "at one least" to --at least one--.

Column 8, line 33 (Approx.), in Claim 19, change "circuit" to --circuit;--.

Signed and Sealed this

Fourteenth Day of December, 2010

David J. Kappos
*Director of the United States Patent and Trademark Office*